United States Patent [19]

Matz et al.

[11] 4,041,249
[45] Aug. 9, 1977

[54] CENTRAL DICTATION SYSTEM WITH PRIVACY SIGNAL USED FOR TRANSCRIBING SCANNING

[75] Inventors: Bjorn J. Matz, Forest Hills, N.Y.; Edward J. Foster, Ridgefield, Conn.

[73] Assignee: Dictaphone Corporation, Rye, N.Y.

[21] Appl. No.: 536,754

[22] Filed: Dec. 27, 1974

[51] Int. Cl.$^2$ ............... G11B 27/30; G11B 27/34; G11B 19/20
[52] U.S. Cl. .................. 179/100.1 DR; 179/6 E; 360/72; 360/74
[58] Field of Search ............ 360/55, 69, 71, 72, 360/74, 90, 91; 179/100.1 DR, 100.1 VC, 100.3 D, 100.4 D, 6 E

[56] References Cited

U.S. PATENT DOCUMENTS

| 2,759,049 | 8/1956 | Scott | 179/100.4 D |
| 2,988,604 | 6/1961 | Nye | 360/71 |
| 3,288,941 | 11/1966 | Langendorf et al. | 179/100.1 DR |
| 3,393,277 | 7/1968 | Nettleton | 360/74 |
| 3,475,564 | 10/1969 | Lindgren et al. | 360/55 |
| 3,728,494 | 4/1973 | Kobler et al. | 179/100.1 DR |

FOREIGN PATENT DOCUMENTS

| 856,935 | 12/1960 | United Kingdom | 179/6 E |
| 810,111 | 3/1959 | United Kingdom | 360/74 |
| 914,069 | 12/1962 | United Kingdom | 179/100.1 DR |

Primary Examiner—Raymond F. Cardillo, Jr.
Attorney, Agent, or Firm—Curtis, Morris & Safford

[57] ABSTRACT

A central dictation system including a plurality of remote dictate stations, a plurality of record/reproduce stations and a plurality of transcribing stations operatively connected to respective ones of the record/reproduce stations. Any one of the remote dictate stations is capable of communicating with any one of the record/reproduce stations so as to execute a dictate and/or playback operation. When a record/reproduce station is communicating with a dictate station, the remaining dictate stations are prevented from gaining access to that communicating record/reproduce station. A transcribing operation can be performed substantially independent of the dictate and/or playback operation. Code recording apparatus is provided to automatically record a predetermined code signal at the conclusion of each dictated message. This recorded code signal prevents the recorded message from being reviewed or erased by the subsequent use of a remote dictate station. During a transcribing operation, these predetermined code signals are detected and are used to implement a scanning operation so that a desired one of the dictated messages can be transcribed, notwithstanding the particular sequence in which that message has been recorded. The record medium may comprise a magnetic tape and noise suppressing circuitry is provided to suppress the inherent tape hiss attending a playback operation when the tape is driven at a very slow speed. In an embodiment wherein the dictation and transcription transducing sites are spaced apart, apparatus is provided to insure that a sufficient amount of magnetic tape is furnished to the transcription transducer site to permit an entire dictated message to be transcribed.

13 Claims, 4 Drawing Figures

CENTRAL DICTATION SYSTEM WITH PRIVACY SIGNAL USED FOR TRANSCRIBING SCANNING

BACKGROUND OF THE INVENTION

This invention relates to a central dictation system and, in particular, to the control of various functions performed during recording and playback operations.

Central dictation systems are known wherein a central record/playback unit is adapted to be individually accessed by any one of a plurality of remote dictate stations so as to record dictated information on a record medium. In such systems, the central record/playback unit can be accessed by only a single dictate station at any given time. While one dictate station is in communication with the central unit all other dictate stations are excluded, or locked out, from also communicating with the central unit.

The advantage of such control dictation systems is that individual dictators need not be concerned with the manipulation of various recording media, nor need they attend to the time consuming task of delivering recording media having dictation thereon to appropriate personnel for transcription. In the typical central dictation system, a recording medium having a relatively large capacity for recording dictation is provided so that received dictation communicated from a remote dictation station is recorded on the medium and can be subsequently reproduced for transcription. In one type of central record/playback unit, the record medium consists of an endless loop of magnetic tape which is driven past a dictation transducing station and is also driven past a transcribing transducing station. These stations are essentially operated independently of each other so that a dictation operation can be performed simultaneously with and independently of a transcribing operation. Thus, such a central dictation system advantageously permits the efficient use of dictating and transcribing apparatus. Moreover, dictated information can be almost immediately transcribed — an earlier portion of a dictated message being transcribed while dictation still is in progress. A typical prior art central dictation system having an endless loop of magnetic tape is described in U.S. Pat. No. 3,817,436 issued June 18, 1974, and is assigned to Dictaphone Corporation, the assignee of the present invention.

It is preferable, in many applications of a central dictation system, to ensure the confidentiality of a previously dictated message. That is, where plural dictate stations are capable of communicating with the record/reproduce station, a message which has been recorded on the endless loop of magnetic tape should not be made available to a subsequent dictator during a subsequent dictate operation so that the previously recorded message can be reviewed or erased or otherwise distorted.

Since, in a central dictation system, many dictated messages are recorded on a single endless loop of tape, it is sufficient to rely upon a single transcribing operator to transcribe each dictated message. Usually, a message will be transcribed in the exact sequence in which it was dictated. In some prior art central dictation systems, if a dictated message is to be transcribed out of sequence, it often is necessary for the transcribing operator to listen to each dictated message until the desired message is reached. Accordingly, there has been a long felt need to provide apparatus whereby a particular message can be rapidly accessed and transcribed, notwithstanding the particular sequential position of that message.

In central dictation systems of the aforedescribed type, the capacity of the system to record dictated messages is determined by the length of the endless loop of tape. Obviously, a more efficient use of that given amount of tape can be achieved if the tape is advanced at a relatively slow speed during recording and playback operations. Thus, a greater volume of dictation, i.e., a greater dictation time, is provided as the tape speed is reduced. However, as is known by those of ordinary skill in the tape recording art, as the tape speed is reduced, undesirable background noise and tape hiss inherent in magnetic recording applications become more pronounced. Also, the signal-to-noise ratio associated with such low speed recording systems often becomes undesirably low, thereby making it difficult to detect an information signal and resulting in degraded audio reproduction. Hence, there exists a long felt need to suppress such undesired noise intrinsic to low-speed magnetic playback systems.

Also, for those central dictation systems having an endless loop of tape which, of course, must extend between a dictate transducer site and a transcribe transducer site, it is expected that a quantity of dictated tape normally will be awaiting transcription. This quantity of tape conveniently can be stored at a storage location between the transducer sites. However, it is quite possible that this quantity of tape can be exhausted. In that event, the portion of the dictated messsage which is recorded on the segment of tape extending between the transducer sites heretofore has been unavailable for immediate transcription. In prior art systems wherein an operator at the transcriber station has no control over any apparatus associated with the dictation station, it is necessary to defer further transcription until the magnetic tape is advanced from the dictation transducer site during a subsequent recording operation.

OBJECTS OF THE INVENTION

It is, therefore, an object of the present invention to provide an improved central dictation system wherein the aforenoted disadvantages and long felt needs of prior art systems are overcome.

Another object of this invention is to provide control apparatus for controlling the various functions performed at a central dictation system to expedite the recording and playing back of audio signals.

A further object of this invention is to provide an improved central dictation system wherein any one of a plurality of remote dictate stations is adapted to communicate with a record/reproduce station and wherein a recorded message is maintained in confidentiality.

An additional object of this invention is to provide a central dictation system wherein plural users at remote dictate stations are individually capable of recording dictated information onto a single record medium at a central location and wherein a subsequent user cannot gain access to a previously dictated message.

It is another object of the present invention to provide an improved central dictation system wherein a record/reproduce station which is adapted to receive dictated messages from any one of a plurality of remote dictate stations is controllable by a single transcriber station whereat the record medium can be scanned to select a particular dictated message for transcription, notwithstanding the sequential order of the selected message.

It is a further object of the present invention to provide improved transcriber-controlled message scanning apparatus in a central dictation system.

A still further object of this invention is to provide a magnetic recording/playback system wherein the magnetic medium is moved at a very slow speed but the background noise and hiss attending signal reproduction from such magnetic medium are suppressed.

A further object of this invention is to provide an improved noise suppressing circuit finding application in a magnetic recording system.

Another object of this invention is to provide an improved central dictation system of the type having a record/reproduce station including an endless loop of magnetic tape which extends between dictation and transcription transducer sites, wherein a predetermined amount of tape is furnished from the dictation transducer site when the reserve supply of dictated tape awaiting transcription has been exhausted but the entire dictated message has not been transcribed.

Various other objects and advantages of the present invention will become apparent from the forthcoming detailed description thereof and the novel features will be particularly pointed out in the appended claims.

SUMMARY OF THE INVENTION

In accordance with this invention, a central dictation system is provided wherein any one of a plurality of remote dictate stations is capable of communicating with any one of a plurality of record/reproduce stations to record dictated information on a record medium and to playback same, and a plurality of transcribing stations are connected to respective ones of the record/reproduce stations so that messages recorded on the record medium can be transcribed; each record/reproduce station being capable of detecting when a remote dictate station no longer is communicating therewith so as to automatically record a predetermined code signal on the record medium immediately following the dictated message, this recorded code signal serving an an impenetrable barrier to prevent the dictated message from being accessed by any subsequent operation of a remote dictate station; these code signals being detected during a record medium scanning operation initiated at the transcribing station so that a particular recorded message can be rapidly selected for transcription, notwithstanding the sequential order in which this particular message had been recorded; and wherein noise suppressing circuitry is provided to suppress low-level signals, such as noise, during a signal reproducing operation.

Another feature of this invention is to permit an endless loop of magnetic tape record medium to be controlled by a transcribing operator so that, when a reserve supply of tape bearing dictated information awaiting transcription has been exhausted, a predetermined amount of tape is advanced to permit the completion of a message transcribing operation.

BRIEF DESCRIPTION OF THE DRAWINGS

The following detailed description will best be understood in conjunction with the accompanying drawings in which.

DETAILED DESCRIPTION OF A CERTAIN ONE OF THE PREFERRED EMBODIMENTS

The Central Dictation System

Figure 1:
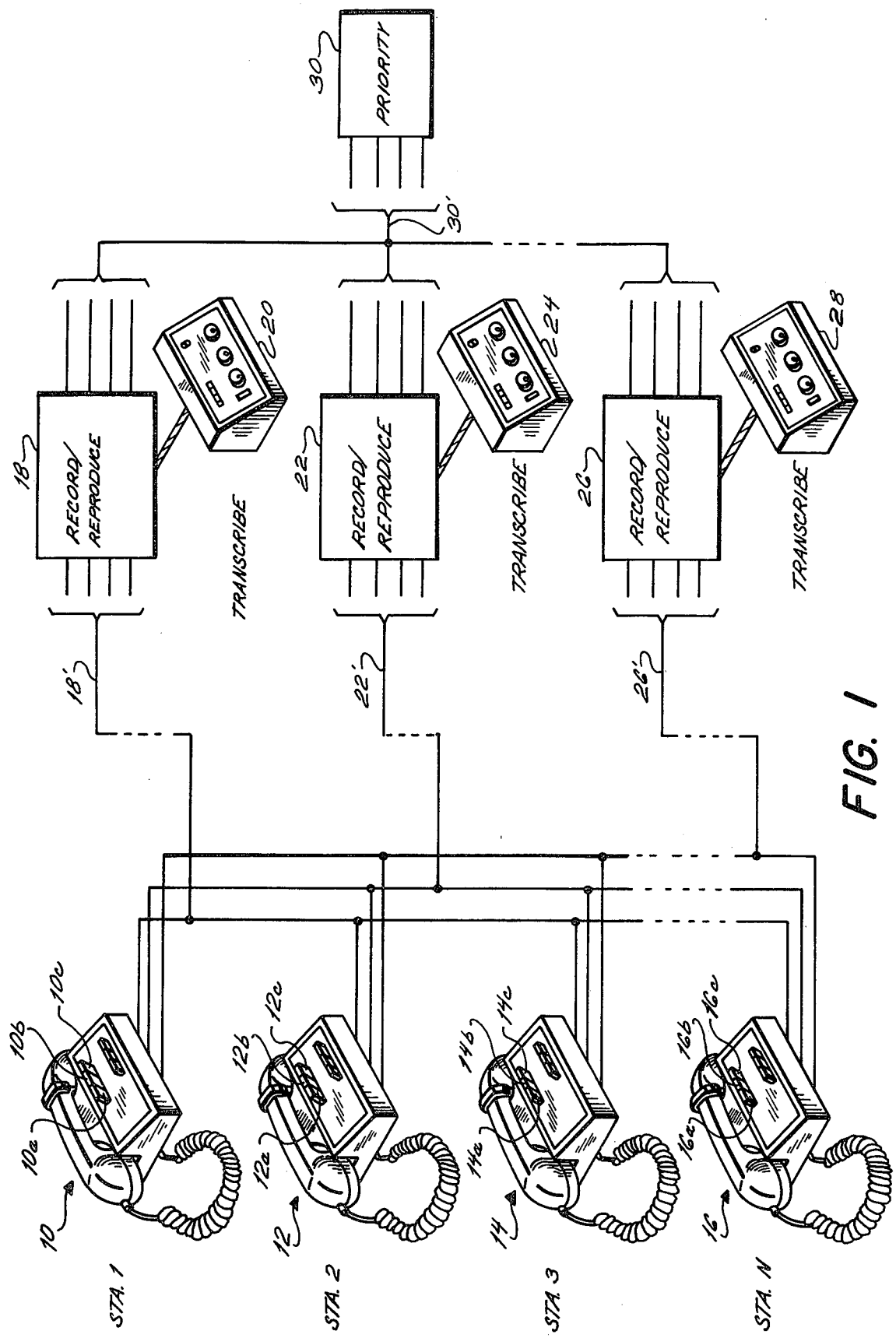
FIG. 1 is a block diagram representing a central dictation system of the type wherein the present invention finds ready application.

Referring now the drawings and, in particular, to FIG. 1, there is illustrated a block diagram representing a central dictation system comprised of a plurality of remote dictate stations, a plurality of record/reproduce stations and a plurality of transcribe stations. As depicted, N remote dictate stations can be provided and, in the interest of simplification, only four dictate station 10, 12, 14 and 16 have been shown. Similarly, although any convenient number of record/reproduce stations can be provided, only three such stations 18, 22 and 26 have been shown. Typically, the record/reproduce stations may be provided at a central location and the remote dictate stations may be provided at any convenient locations and may be separated from the central location by any suitable distance. For example, the remote dictate stations may be situated in various separate offices in an office building and the central location may be situated at a designated centralized location in such office building.

A typical record/reproduce station 18 is comprised of a record medium such as an endless loop of tape, in combination with various transducing heads, tape drive mechanisms, audio electronics and control apparatus for effecting the recording and reproduction of audio information for achieving a dictation and a transcription operation. The record medium included in the record/reproduce station is adapted to be driven so as to traverse a dictation site having a magnetic transducer such as a combination record/playback/erase head, and a transcription site, also having a magnetic transducer such as a playback head. Although physically contained within the same structure, the dictation and transcription sites are independently operated. In addition, since dictation can proceed without a concurrent transcription operation, tape which has been dictated and which is awaiting transcription is adapted to be stored in serpentine fashion within a tape housing storage location between the dictation and transcription sites. Also, since transcription can proceed without a concurrent dictation operation, magnetic tape which has been transcribed and is awaiting subsequent reuse at the dictation site is adapted to be stored, also in serpentine fashion, at another location between the dictation and transcription sites. Accordingly, the record/reproduce station can be similar to the record/playback unit described in the aforenoted U.S. patent.

Since each remote dictate station is capable of communicating with any of the record/reproduce station 18, 22 and 26, each record/reproduce station is connected to each of the remote dictate stations by a conducting cable. Accordingly, the record/reproduce station 18 is connected by a conducting cable 18' to the N remote dictate stations. As shown, these remote dictate stations are connected in parallel to the conducting cable 18'. Similarly, the record/reproduce station 22 is connected via a conducting cable 22' to each of the N remote dictate stations. So also, a conducting cable 26' connects the record/reproduce station 26 to each of the N remote dictate stations. Although all of the illustrated remote dictate stations are connected in parallel to each of the recordreproduce stations, only a single dictate station can communicate at any given time with a single record/reproduce station. Hence, in an expected installation comprised of many more remote dictate stations than there are record/reproduce stations, it will be appreciated that, when each of the record/reproduce stations is communicating with a remote dictate station, any additional remote dictate station will be precluded from gaining access to a record/reproduce station. Suitable seizure and privacy control circuits are provided for this purpose.

A typical remote dictate station, such as the dictate station 10, is comprised of audio and function control apparatus which is connected by a conducting cable through a plurality of switches 10a, 10b and 10c to the conducting cables 18', 22' and 26'. The purpose of the switches 10a-10c is to permit an operator at the dictate station 10 to select a particular record/reproduce station to which audio information and function control commands are to be transmitted and, in the interest of simplification, only three such switches have been shown. The switches 10a-10c may, therefore, comprise conventional push button-type switches having visual indicators, such as lamps, associated or integral therewith. The purpose of such lamps is to indicate when a particular record/reproduce station is unavailable to be accessed by a remote dictate station, such as when that record/reproduce station is then communicating with another dictate station, and to thus enable an operator to properly select an available record/reproduce station for communication. Thus, if the record/reproduce station 18 is available, an operator at the remote dictate station 10, by depressing the switch 10a will connect the audio and control function electronics at the dictate station 10 to the record/reproduce station 18 via the conducting cable 18'. Similarly, if the record/reproduce station 22 is available, the switch 10b, upon being closed, will connect the audio and control function electronics to the record/reproduce station 22 via the conducting cable 22'. The operation of the switch 10c effects a similar connection between the remote dictate station 10 and the record/reproduce station 26. If a switch associated with an unavailable record/reproduce station is depressed, the remote dictate station will not be operably connected thereto and, in one embodiment, a distinctive signal, such as a predetermined tone, will be provided at the remote dictate station to signify the unavailability of the selected record/reproduce station. The privacy and seizure control circuitry which insures that only a single remote dictate station can gain access to a record/reproduce station may be of the type described in U.S. Pat. No. 3,835,261, which issued on Sept. 10, 1974 and is assigned to the assignee of the present invention. A signal which is extended to all remote dictate stations from a record/reproduce station to indicate the status, i.e., availability, of such record/reproduce station is transmitted over one of the conducting channels included in the conducting cable, such as cable 18'.

The various function commands generated from each of the remote dictate stations are transmitted to a record/reproduce station over another conducting channel included in the conducting cable, such as cable 18'. These command signals are constant currents of predetermined magnitudes and are generated in response to the selective manual operation of various switches disposed at the dictate station. Typical of such function commands are "dictate", "rewind", "stop", "play", and "fast forward". Each of these command signals serves to control the movement of tape past the dictation transducer site and, additionally, conditions the dictation transducer for a record or playback mode of operation. The generation, detection and use of these command signals are described in detail in copending application Ser. No. 536,753, filed Dec. 24, 1974. An example of mechanical driving apparatus which is used to move the magnetic tape is disclosed in co-pending application Ser. No. 536,856, filed Dec. 24, 1974, now U.S. Pat. No. 3,934,774, issued Jan. 27, 1976.

Audio signals are transmitted from a remote dictate station to a record/reproduce station during dictation and are returned to the remote dictate station during a review of recorded information via a further conducting channel included in the conducting cable, such as conducting cable 18'. A further conducting channel included in the conducting cable is adapted to extend the system reference potential, such as ground, to a remote dictate station when the record/reproduce station is properly accessed by the remote dictate station.

In a typical remote dictate station, the sound transducers for converting sound signals into audio signals and for transducing audio signals into sound signals are provided as a conventional microphone and loudspeaker. Such sound transducers are contained in a handset which is associated with various function control switches. Typically, the handset is adapted to be supported on a cradle having a cradle switch which is actuated when the headset is removed to thereby gain access to a record/reproduce station and is deactuated when the handset is returned to the cradle upon the completion of a dictation operation. To insure that subsequent dictated information which might be derived from another remote dictate station is not recorded over previously recorded information, the deactuation of a cradle switch results in the automatic recording of a predetermined code signal immediately following a recorded message. This predetermined code signal may be recorded in the same channel as that in which dictated information is recorded, or may be recorded in a separate channel. Also, the code signal may comprise a selected code, a selected tone or the absence of tone. In any of these embodiments, the code signal is sensed when the tape is reversed past the dictation transducer site to automatically prevent further tape bearing prerecorded information from also being reversed past the dictation transducer. Thus, a subsequent dictation operation will not affect previously recorded information; nor will such previously recorded information be reproduced during a subsequent dictation or playback operation. The recording of such predetermined code signal and the sensing thereof is described in detail hereinbelow.

Although each of the remote dictate stations is here illustrated as including plural station selecting switches, such as switches 10a, 10b and 10c, to thereby permit an operator to manually select a desired record/reproduce station for communication, in an alternative embodiment such manual selecting switches are replaced by an automatic switching matrix. Such switching matrix is conventional and is of the type generally used in telephone switching applications. When such an automatic switching matrix is used, a remote dictate station is automatically connected to the first record/reproduce station which becomes available. The conditioning of a record/reproduce station with respect to its availability can be a function of the amount of unused tape present therein and upon which information can be recorded.

As a further feature of the central dictation system illustrated in FIG. 1, an additional, predetermined record/playback unit 30 is provided and is intended to receive dictated information for recording when such information is of a high priority of importance. As shown, the priority unit 30, which may be similar to the record/reproduce stations 18, 22 and 26, is connected by a conducting cable 30' to each of the record/reproduce stations 18, 22 and 26. The cable 30' may include multiple conducting channels such as are included in each of the cables 18', 22' and 26'. The record/reproduce stations 18, 22 and 26 are connected in parallel to the conducting cable 30' by additional cables, each including multiple conducting channels. Accordingly, the priority unit 30 bears the same relationship to each of the record/reproduce stations as a record/reproduce station bears to each of the remote dictate stations. When a transfer function command is transmitted from a remote dictate station to a record/reproduce station in communication therewith, such transfer command results in the switching of, for example, the dictate station 10 from communicating with, for example, the record/reproduce station 18, to now communicate with the priority unit 30. A conducting path will thus extend from the cable 18', through the record/reproduce station 18 to the cable 38' and to the priority unit 30. While the remote dictate station is in communication with the priority unit, the record/reproduce station 18 will not be operatively coupled to the remote dictate station, but will maintain a quiescent or stand-by condition until communication with the priority unit is completed. This feature is described in greater detail in the aforenoted copending application Ser. No. 536,753.

Each of the record/reproduce stations 18, 22 and 26 is connected to a transcribe station 20, 24 and 28, respectively. By suitable operation thereof, an operator of a transcribe station causes various transcribe control function signals to be transmitted to the associated record/reproduce station to thereby control the movement of the recording tape past the transcription transducer site so as to facilitate a transcribing operation. Generally, the transcribe station is provided with suitable switches, such as foot-pedal actuated switches, to control the movement of the tape past the transcription transducer site. A speed control switch is provided to accomodate variations in tape speed or to deliberately alter the tape speed, as desired. In addition, a sound reproducer, such as a loudspeaker or headphones, is provided to receive reproduced audio signals, and suitable audio electronics are provided to permit an adjustment in the reproduced sound, as desired.

The recorded code signals, although serving to ensure the confidentiality of a previously dictated message so that this message cannot be played back or altered by the subsequent operation of a remote dictate station, serves the additional function of implementing a scanning operation during a transcription mode of operation. That is, since the code signals are recorded at the start of a dictated message, the tape can be rapidly scanned so that if each code signal is detected and indicated, a count of such indications will identify a particular dictated message. Hence, although messages are recorded in sequence, any message can be accessed for transcription regardless of its sequential position merely by counting the code signal indications until a desired message is reached. For example, if message 65 is being transcribed but message 74 is to be transcribed next, the tape merely is advanced, nine code signal indications are counted, and the tape is stopped at the commencement of the proper message. A reversal scan can be similarly achieved. Thus, it is not necessary for all intermediate messages to be reviewed until the desired message is reached.

Since an endless loop of magnetic tape extends between the dictation and transcription transducer sites, it is possible for a reserve supply of dictated tape which is awaiting transcription to be exhausted. In the event the tape between the transducer sites is taut and, until additional tape is paid out from the dictation transducer site, further transcription is inhibited. If, at the time this intermediate portion of tape becomes taut the record/reproduce station is not communicating with a dictate station, there normally will not be an advance of tape until the record/reproduce station is subsequently seized by a dictate station, and transcription will be delayed until that time. This delay is avoided by one feature of the present invention which automatically advances a predetermined amount of tape from the dictation transducer site to enable the completed transcription of an entire dictated message.

Although not shown herein, an alternative embodiment of a central dictation system includes a supervisory console to supervise the operations of the record/reproduce stations, the transcribe stations and the priority unit. For example, suitable switching apparatus can be provided such that each transcribe station is connected through the supervisory console to its associated record/reproduce station. In this configuration, a supervisor can, if desired, connect transcriber 20, for example, to the record/reproduce station 22. Such a connection might be preferred so as to not require an operator at, for example, the transcribe station 20 to relocate at, for example, the transcribe station 24 in order to transcribe the dictated information recorded at the record/reproduce station 22. Also, the skills of a particular transcriptionist may be readily matched to the amount of dictated tape awaiting transcription in a particular record/reproduce station. Furthermore, a supervisory operator may intentionally dispose an otherwise available record/reproduce station into its unavailable condition if it is determined that the capacity of that record/reproduce station to receive additional dictation will soon be reached while another record/reproduce station exhibits far more acceptable capacity. The supervisory console might also be provided with audio communication equipment to permit a supervisory operator to communicate with an operator at a remote dictate station, if desired, and might furthermore manually transfer such a remote dictate station from communication with a record/reproduce station to communication with the priority unit.

The foregoing general description of a central dictation system of the type depicted in FIG. 1 is merely intended as a broad discussion of various functions, operations and features of such system and is not to be construed as limiting the central dictation system only to those features which have been described.

Dictation/Playback Control Apparatus

Figure 2:
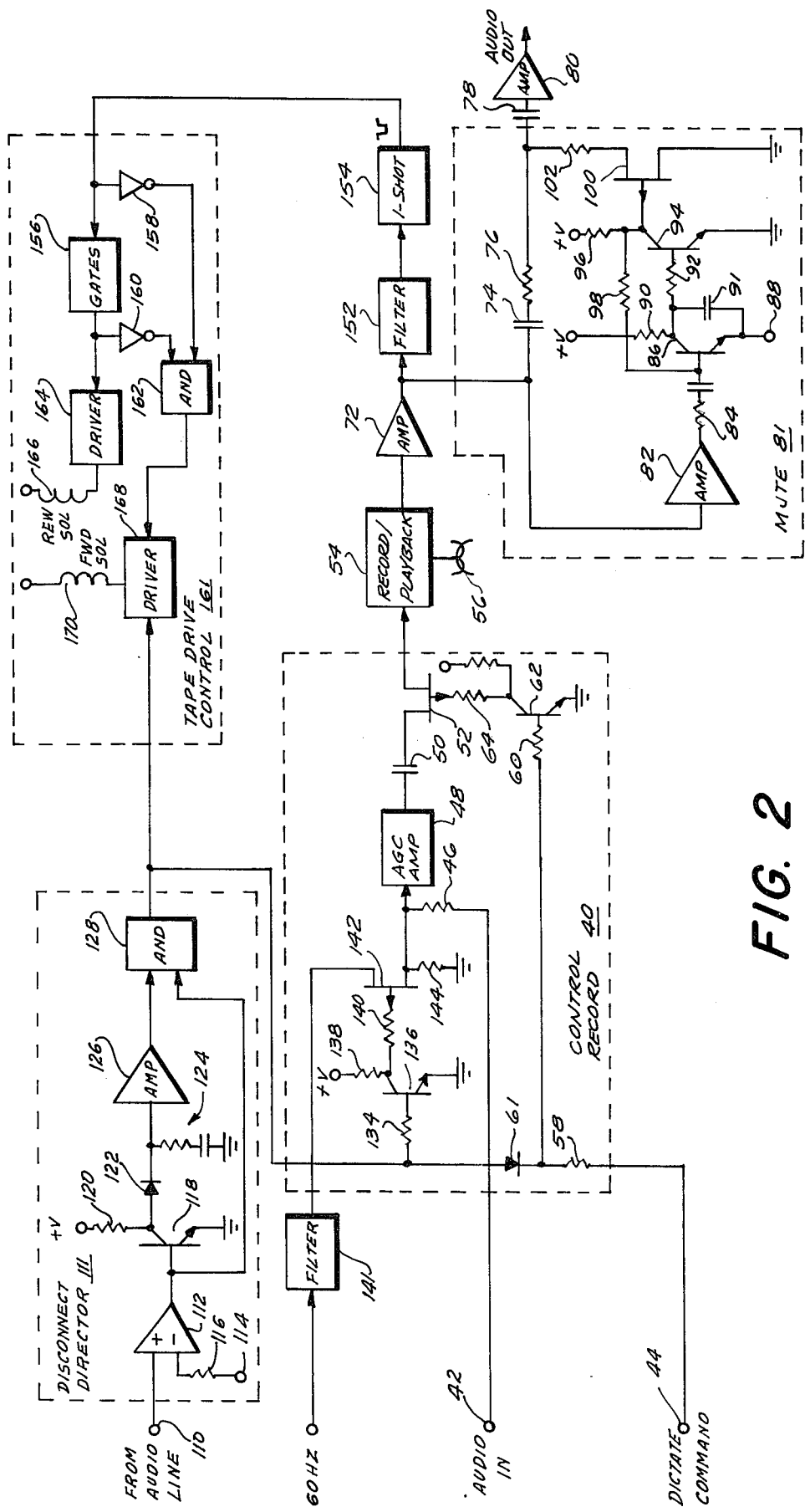
FIG. 2 is a representation in partial schematic and partial block form of a portion of the record/playback control apparatus of the present invention which is operable during a dictation/playback operation.

Referring now to FIG. 2, there is illustrated a partial schematic, partial block diagram of record/playback control apparatus which is operable during a dictation/playback operation. This apparatus is comprised of a record control circuit 40, a playback muting circuit 81, a disconnect detector 111, and a tape drive control circuit 161.

The record control circuit 40 is adapted to receive audio signals transmitted to the record/reproduce station from a remote dictate station and to record same on the magnetic tape in response to a dictate command. Accordingly, an amplifier 48 having an automatic gain control circuit is connected through a resistor 46 to an audio signal input terminal 42. The AGC amplifier 48 is capacitively coupled by a coupling capacitor 50 to the control electrode of a transistor 52. As is depicted, this transistor may comprise any field effect transistor (FET). The drain electrode of this FET is connected through a conventional record/playback circuit 54 to the record/playback head 56 whereby audio signals are recorded on the magnetic tape.

The FET 52 acts as a switch for coupling the audio signals to the record/playback circuit and, to this effect, has its gate electrode connected through a resistor 64 and the collector-emitter circuit of the transistor 62 to ground. The base electrode of the transistor 62 is connected to a dictate command terminal 44 via resistors 58 and 60. The dictate command terminal is adapted to receive a control signal when a dictate function is selected. This dictate control signal may be of the type produced by the apparatus disclosed in the aforenoted co-pending application Ser. No. 536,753.

In addition to recording the dictated audio signals on the record medium the record control circuit 40 is adapted to record a predetermined code signal which is generated when a remote dictate station has completed its communication with the record/reproduce station. This predetermined code signal is supplied to the aforedescribed audio signal recording circuitry by transistor devices 136 and 142. More particularly, the transistor 142, which may comprise an FET transistor, functions as a solid state switch which is adapted to receive a predetermined code signal which comprises an AC signal. When actuated, the FET 142 permits the received AC signal to be transmitted to the record/playback circuit 54. Accordingly, the source electrode of the FET 142 is connected through a filter circuit 141 to a suitable source of AC signals. For the purpose of the present invention, the filter 141 is supplied with a relatively low frequency AC signal of, for example, 60 Hz. The control electrode of the FET 142, i.e., the gate electrode thereof, receives an output signal of predetermined duration produced by the disconnect detector 111.

The disconnect detector 111 is adapted to produce the aforenoted output signal of predetermined time duration when it is detected that a remote dictate station has completed its communication with the record/reproduce station. As described in the aforenoted copending application Ser. No. 536,753 when a remote dictate station is operatively connected to the record/reproduce station, a DC voltage of a first predetermined magnitude is provided on one of the conducting channels included in, for example, the conducting cable 18' of FIG. 1. For the purpose of the present discussion, this first DC voltage level may be assumed to be a relatively lower level. When the remote dictate station has completed its communication with the record/reproduce station, the hand set at the dictate station normally is returned to its cradle to thereby deactuate a cradle switch, resulting in a change in the voltage level of the aforedescribed DC voltage. This voltage may be assumed to now increase to a relatively higher DC level. The terminal 110 illustrated in FIG. 2 is adapted to be supplied with a voltage derived from the appropriate conducting channel included in the conducting cable 18' so that, when the remote dictate station is in communication with the record/reproduce station, i.e., the cradle switch at the dictate station is actuated, a relatively lower voltage is applied to the terminal 110. However, when the remote dictate station has disconnected from the record/reproduce station, i.e., the cradle switch is deactuated, the terminal 110 is supplied with a relatively higher voltage. This terminal is supplied to an amplifier 112 which is adapted to sense when the DC voltage indicating the status of communication with the record/reproduce station changes from the lower level to the higher level. Accordingly, the amplifier 112 may comprise a conventional level detector and is shown as a difference amplifier having its positive input connected to the terminal 110 and its negative input connected to a terminal 114 via a resistor 116. A reference, or threshhold level, may be supplied to the terminal 114 so that, when the remote dictate station is operatively connected to the record/reproduce station, the voltage at the terminal 110 is less than the voltage at the terminal 114, resulting in a relatively negative voltage output produced by the amplifier 112. Consequently, when the remote dictate station has disconnected from the record/reproduce station, the resultant higher DC voltage now applied to the terminal 110 would exceed the voltage received at the negative input of the amplifier 112, resulting in a relatively positive output voltage produced by the amplifier.

The output of the amplifier 112 is connected to a transistor 118 which is coupled to a timing circuit 124. The amplifier 112 is further connected to one input of a coincidence circuit 128, another input of which being coupled through an amplifier 126 to the timing circuit 124. As is known, a coincidence circuit is adapted to produce an output signal when input signals are simultaneously supplied to each input terminal. Accordingly, the coincidence circuit 128 may comprise a conventional AND gate. For the purpose of the present description, it will be assumed that the AND gate, which operates upon binary representative signals, is adapted to produce a binary 1 output, represented by, for example, a relatively positive voltage potential, when each input is supplied with a binary 1. A binary 0 is produced by the AND gate when any input is supplied with a binary 0. Of course, if desired, alternative logic gating circuits may be used which operate upon negative potentials or wherein the binary notations are represented by polarities opposite to those described above.

The AND gate is connected to a driver circuit 168 included in the tape drive control circuit 161. The driver circuit is a conventional circuit capable of responding to, for example, a binary 1 so as to energize additional apparatus connected thereto. As shown, a forward solenoid energizing coil 170 is connected to the driver circuit 168 and will be energized by the driver circuit. A forward solenoid, not shown, is associated with the energizng coil 170 to effect a forward movement of magnetic tape and need not be further described.

The AND gate 128 is additionally coupled through a resistor 134 to a transistor 136, the transistor being adapted to control the switching condition of the FET 142. Accordingly, the collector electrode of the transistor 136 is connected to a source of energizng potential +V by a collector resistor 138 and, additionally, is connected by a resistor 140 to the gate electrode of the FET.

The circuitry thus far described is adapted to control a signal recording operation in the manner now to be described. Normally, when a dictation operation is in progress, a dictation command signal is supplied to the terminal 44 which renders the transistor 62 conductive so as to turn on the FET 52. Hence, the AGC amplifier 48, which is supplied with dictated information from the audio input terminal 42 is connected through the FET to the record/playback circuit 54 so that the dictated message can be recorded by the record/playback head 56 on the magnetic tape.

At the conclusion of dictation the remote dictate station is electrically disconnected from the record/reproduce station so that the DC voltage applied to the terminal 110 is increased from a lower level which normally obtains during communication to a higher level indicative of the completion of dictation. Accordingly, the amplifier 112 supplies a relatively positive potential to the AND gate 128 and, additionally, to the transistor 118. This transistor had previously been non-conductive so that the voltage at its collector electrode was substantially equal to the operating voltage +V. This DC voltage had been supplied through the diode 112 to the timing circuit 124 to charge up the capacitor included in the timing circuit to the level +V. This positive voltage exhibited by the capacitor had been supplied through the amplifier 126 to an input of the AND gate 128. However, while the transistor 118 had been non-conductive, the output of the amplifier 112 had been at ground potential or at a relatively negative voltage level which inhibited AND gate 128 from producing a binary 1 output. However, now that the amplifier 112 supplies a relatively positive voltage to the transistor 118, it is seen that each input of the AND gate 128 is supplied with voltages representing a binary 1 so that a binary 1 is produced. At the same time, the transistor 118 now is rendered conductive and the voltage appearing at its collector electrode is reduced to approximately ground potential. The previously charged capacitor included in the timing circuit 124 is no longer supplied with a charging voltage and, therefore, discharges through the amplifier 126. Depending upon the particular RC time constant of the timing circuit, the amplifier 126 supplies a binary 1 to the AND gate 128 until the timing circuit 124 has sufficiently discharged. Therefore, it is seen that, when a remote dictate station disconnects from the record/reproduce station, the AND gate 128 produces a binary 1 output for a predetermined duration as a function of the time constant of the timing circuit 124.

The binary 1 produced by the AND gate 128 is supplied to the driver circuit 168 to actuate the driver circuit so that the forward solenoid energizing coil 170 circuit is energized. Consequently, as is understood, the tape is advanced past the record/playback head 56 for the duration of the binary 1 output produced by the AND gate.

The output of the AND gate 128 is additionally applied to the transistor 136 to actuate this transistor which, in turn, switches the FET 142 to its conducting state so that the AC signal supplied through the filter 141 to the source electrode now is transmitted to the amplifier 48. The AND gate output is further supplied to the transistor 62 via a diode 61 so as to actuate this transistor whereby the FET 52 is rendered conductive. Accordingly, the AC signal switched to the amplifier 48 by the FET 142 is further transmitted through the FET 52 to the record/playback circuit 54 for recording by the record/playback head 56. It may be appreciated that, if the AC signal supplied to the record/playback head is of a relatively lower frequency and if the magnetic tape is moved at a relatively fast speed, then this recorded signal will be reproduced as a relatively higher frequency AC signal when the magnetic tape is moved at the normal playback speed.

At the conclusion of the timing interval established by the timing circuit 124, the forward solenoid energizing coil 170 is de-energized and the respective FET devices 52 and 142 are rendered non-conductive. Hence, the illustrated circuitry now is prepared for a subsequent dictation and/or playback operation. Thus, it is seen that successive dictated messages are separated by the recorded code signal. It is, of course, recalled that the code signal may be recorded on a separate channel and that the code signal may, alternatively, comprises a selected code or the absence of tone.

This recorded code signal serves to prevent an operator at a remote dictate station from reviewing or erasing a previously recorded dictated message. This feature is implemented by a filter circuit 152 which is connected to the record/playback circuit 54 by an audio signal amplifier 72 and a one-shot circuit 154 which is coupled to the filter circuit 152 and is adapted to produce an output pulse of predetermined duration which is applied to the tape drive control circuit 161. The filter circuit 152 is adapted to detect the recorded code signal when it is reproduced by the record/playback head 56. When this code signal is detected, the filter circuit applies a triggering signal to the one-shot circuit 154, whereby the one-shot circuit produces an output pulse of predetermined duration. The one-shot circuit is a conventional circuit element and may comprise, for example, a monostable multivibrator, or the like. If the output voltage produced by the one-shot circuit normally is a relatively positive or higher level potential, then, in response to a triggering voltage applied thereto, the one-shot circuit produces a lower level output voltage such as, for example, ground potential. This lower level voltage which, for the purpose of the present discussion may be assumed to represent a binary 0, is generated for a predetermined duration dependent upon the time constant of the one-shot circuit.

Since the code signal is recorded only after the completion of a dictation and/or playback operation, it is appreciated that, while the record/reproduce station is communicating with a remote dictate station, no record signal will be sensed when the tape is advanced in a forward direction. However, if the operator at the remote dictate station wishes to review portions of the information which he has dictated during his seizure of the record/reproduce station, the tape will be driven in the reverse direction past the record/playback head 56. This function is derived from the gating circuit 156 which supplies a binary 1 to the driver circuit 164 so that a rewind solenoid energizing coil 166 may be energized to effect the tape reversal operation. One embodiment of the specific circuitry which may comprise the gating circuit 156 is disclosed in detail in the aforenoted copending application Ser. No. 536,753. However, a detailed description of such gating circuit is not necessary for a complete understanding of the present invention.

If, during the tape reversal, a recorded code signal is detected by the filter circuit 152, indicating that a previously recorded dictated message is about to be reached, the one-shot circuit 154 is energized to supply an inhibit signal to the gating circuit 156. This is represented by the binary 0 supplied to the gating circuit. Consequently, the energizing coil 166 is de-energized and the rewind solenoid is deactuated. The magnetic tape no longer is moved in the reverse direction. In addition, the inhibit signal produced by the one-shot circuit 154 is used to actuate a driver circuit 168, which, in turn, energizes the forward solenoid energizing coil 170 to thereby advance the magnetic tape in a forward direction for the duration of the produced inhibit signal. Although suitable circuitry can be designed to perform this function, one embodiment is shown as being comprised of an AND gate 162 having a first input connected to the gating circuit 156 by an inverting circuit 160 and a second input connected to the one-shot circuit 154 by an inverting circuit 158. Thus, it is seen that when the one-shot circuit produces a binary 0 for a predetermined duration, the gating circuit 156 is inhibited thereby to supply a binary 0 to the inverting circuit 160 which, in turn, inverts the logical sense of this signal to now apply a binary 1 to the AND gate 162. Also, the binary 0 produced by the one-shot circuit 154 is inverted by the inverting circuit 158 and is supplied as a binary 1 to the AND gate 162. In view of these input signals applied thereto, the AND gate 162 produces a binary 1 which actuates the driver circuit 168 to result in the forward movement of the magnetic tape for the duration of the one-shot circuit output signal.

It should be appreciated that, in the interest of simplification, the various other control apparatus which normally are provided to energize the forward solenoid energizing coil are not shown.

Therefore, it is seen that the confidentiality of a previously recorded dictated message is preserved. An operator at a remote dictate station which is presently communicating with the record/reproduce station is prevented from reversing the tape so as to gain access to the previously recorded dictated messages thereon.

NOISE SUPPRESSION

To provide a sufficiently high capacity for a large volume of recorded information, the endless loop of magnetic tape is moved past the record/playback head 56 at a very slow speed. As a numerical example, the tape speed may be as slow as 0.7 inches per second. Of course, lower speeds may be used, if desired. Those or ordinary skill in the magnetic recording art will recognize that, in a magentic tape record/playback system, as the tape speed is reduced, the attendant background noise and hiss becomes more pronounced. Also, the signal to noise (S/N) ratio is reduced which makes it difficult to accurately detect a proper audio signal.

Accordingly, a noise suppressing circuit 81 is provided to suppress the aforenoted background noise and tape hiss which normally accompanies a playback operation. This noise suppressing circuit is connected to the amplifier 72 to receive reproduced audio signals and includes a transmission circuit formed of the capacitor 74 and resistor 76 over which the audio signals are transmitted to an amplifier 80. The amplified audio signals are returned to the remote dictate station for a review of recorded information.

The audio signal transmission circuit is adapted to be shunted to ground by the series connection of a resistor 102 and an FET 100. When the FET is rendered conductive so that the resistor 102 is effectively connected to the audio signal transmission circuit, then the combination of the resistors 76 and 102 act as a conventional voltage divider circuit. If the resistance value of the resistor 76 is much greater than the resistance value of the resistor 102, then the voltage at the resistor 102 is greatly reduced, and this reduced voltage is capacitively coupled to the amplifier 80. Thus, when the FET 100 is actuated, the signal normally transmitted to the amplifier 80 is significantly attenuated. As a numerical example, the relationship between the resistors 76 and 102 may effect a voltage attenuation of, for example, 12 db. It is preferred that this signal attenuation be selectively provided only when the reproduced signals supplied by the amplifier 72 are of a low level.

Accordingly, a level detecting circuit formed of an amplifier 82 and transistors 86 and 94 is provided to actuate the FET 100 when the signal level of the reproduced signals is less than a predetermined threshold level. The level detecting circuit may comprise a conventional threshold detector whereby the level of the signal provided by the amplifier 72 is compared to a threshold level and when the signal level falls below the threshold level, the FET 100 is actuated. One embodiment of a threshold detector which may be used is comprised of the amplifier 82 which is connected to receive the signals supplied by the amplifier 72 and which is connected at its output terminal to the transistor 86. A terminal 88 is provided to supply a control voltage to the emitter electrode of the transistor 86. Of course, if desired, the amplifier 82 may comprise a conventional differential amplifier having a second input terminal supplied with a reference threshold level to which the signal level is compared. The collector electrode of the transistor 86 is connected to a delay capacitor 91 and is further connected to the transistor 94; a hysteresis resistor 98 is provided in a feedback path from the transistor 94 to the transistor 86. As will soom become apparent, the delay capacitor 91 is adapted to prevent a muting operation during short intervals of silence. The collector electrode of the transistor 94 is in turn, connected to the gate electrode of the FET 100 so that the actuation of the FET is dependent upon the conductivity of the transistor 94.

When the reproduced signals exceed the threshold level established by the amplifier 82 and transistor 86, the output of the amplifier is relatively positive to render the transistor 86 conductive. Hence, the control voltage applied to the terminal 88 which, for example, may be a low level DC voltage and may be of negative polarity, is supplied to the transistor 94 to thereby maintain that transistor in its nonconductive state. As a result thereof, the bias voltage at the gate electrode of the FET 100 is not sufficient to turn the FET on. Accordingly, the resistor 102 is effectively disconnected from the audio signal transmission path and the signals provided by the amplifier 72 are coupled to the amplifier 80 with negligible attenuation.

However, one the signal level supplied by amplifier 72 is reduced below the threshold level, the output voltage produced by the amplifier 82 is not sufficient to maintain the transistor 86 in its conductive state. Therefore, the capacitor 91 now charges to a relatively positive voltage which is then supplied through the resistor 92 to the transistor 94. Following the delay established by the charging of the capacitor, the transistor 94 now is turned on and current can flow from the gate electrode of the FET 100 through the conducting transistor 94 to ground. The FET is actuated and the resistor 102 now is effectively connected in shunt relationship to the audio signal transmission path. The resistors 76 and 102 form a voltage divider network so that the divided voltage furnished at the junction defined by these resistors is greatly attenuated and is coupled to the amplifier 80. If desired, signal attenuation can be achieved by an active attenuator such as model MFC 6040, manufactured by the semiconductor division of Motorola, Inc. This attenuation of the low level signal results in effective muting of annoying background noise and tape hiss. Consequently, the audio playback operation is enhanced and the operator at the remote dictate station will not be disturbed by undesired background noise or tape hiss. Therefore, when speech is reproduced, it is played back normally. However, when there is a pause in the recorded speech (other than the aforenoted short intervals of silence), the background noise which would pronounced because of poor S/N ratio at low tape speeds, is attenuated. This has the effect of improving the effective S/N ratio over that obtained fron an amplifier, while permitting low level signals to be audibly perceived.

It may be appreciated that the frequency range which is transmitted by the filter 152 is selected such that only the aforedescribed code signal is detected to actuate the oneshot circuit 154. The actuation of this circuit will not be achieved in response to low level audio signals, background noise or tape hiss which may be provided by the amplifier 72.

Transcriber Tape Scanning

Figure 3:
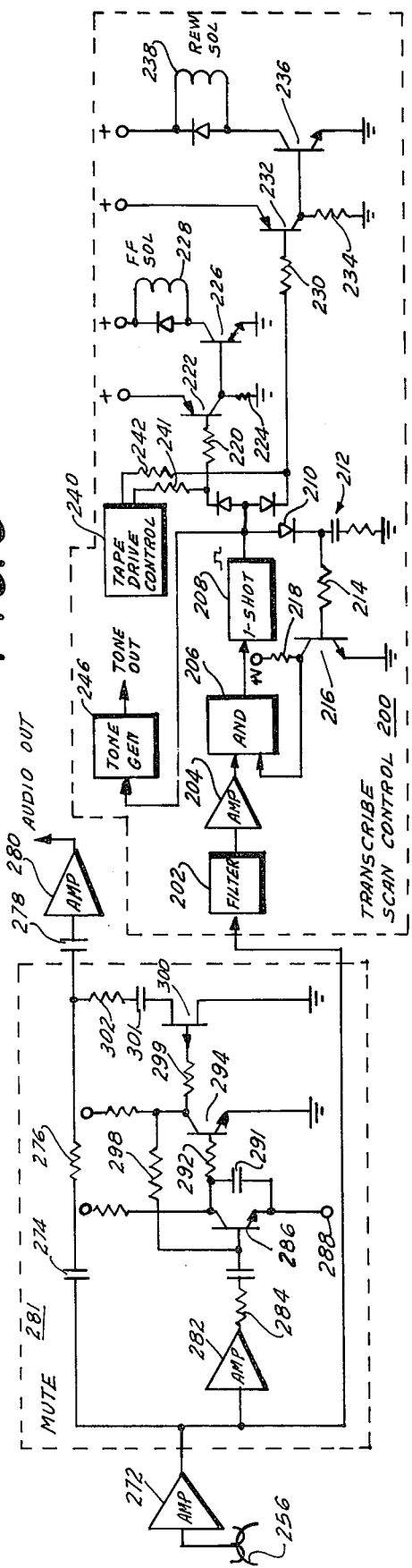
FIG. 3 is a representation in partial schematic and partial block form of record/playback control apparatus which is operable during a transcription operation.

The aforedescribed recorded code signals which are used during a dictation and/or playback operation to preserve the confidentiality of a previously recorded message are additionally used during a transcription operation to permit a transcribing operator to rapidly scan the dictated tape so that any desired message can be randomly selected for transcription regardless of the particular sequential order in which that message was dictated. In particular, FIG. 3 illustrates a transcribe scan control circuit 200 which is adapted to detect the recorded code signals and to provide indications of each such detected signal. These indications may be used by the transcribing operator to identify the particular dictated messages so as to move the tape in an appropriate direction past a playback head whereby a desired message can be selected for transcription. As an example, each indication can be recorded as, for instance, a count so that when the accumulated count corresponds to a desired message, that message is in position for reproduction. The count recording of messages may, of course, be effected by suitable apparatus or may be mentally effected by the transcribing operator.

The transcribe scan control circuit 200 is comprised of a filter circuit 202 which is connected by a playback amplifier 272 to the playback head 256 disposed at the transcription transducer site. The filter is adapted to detect the aforedescribed code signal when it is reproduced by the playback head 256 and supplies an output signal through an amplifier 204 to an AND gate 206. In addition to the input coupled to the amplifier 204, the AND gate 206 includes another input which is connected to a timing circuit 212 by a transistor 216 and an output which is connected to a one-shot circuit 208. The one-shot circuit is adapted to provide an output voltage which normally is of a relatively low level, such as ground potential, and which is changed to a higher level for a predetermined duration dependnt upon the time constant of the one-shot circuit when this circuit is supplied with a triggering input signal. This output pulse produced by the one-shot circuit is supplied by a diode 210 to the timing circuit 212 and, additionally, to a tone generator 246 and to tape driving circuits, to be described. The timing circuit 212 is illustrated as an RC circuit wherein the capacitor normally is uncharged until the positive voltage produced at the output of the one-shot circuit 208 is supplied thereto. This voltage tends to charge the capacitor to a positive voltage and, when the one-shot circuit output voltage terminates, the capacitor discharges at a rate dependent upon the time constant of the RC circuit.

The tone generator 246 may comprise a conventional actuable tone oscillator which is responsive to a positive voltage applied thereto for producing an output tone signal. Although not shown in detail, this tone signal produced by the generator 246 is adapted to be supplied to a sound transducer to provide an indication to the transcribing operator that a recorded code signal has been detected. Alternatively, the tone signal produced by the tone signal generator may be used to actuate other indicating devices, such as a lamp, buzzer, or the like.

It should be appreciated that, at the transcribing station, suitable switches are provided to selectively advance the tape past the transcription transducer site at, for example, a relatively fast speed in the forward direction, a relatively slow, playback speed in the forward direction and a relatively fast speed in the reverse direction. Such switches may be in the form of foot-pedal actuated switches, push-button switches or the like. These switches, upon being actuated, operate the tape drive control circuitry 240 which, in turn, supplies suitable energizing signals to various tape drive apparatus. For example, fast-forward, forward and rewind solenoids may be provided to activate suitable tape driving structures to effect fast-forward, forward and rewind operations, respectively. For the purposes of illustration, the fast-forward solenoid is seen to include an energizing coil 228 which is connected to a coil driving transistor 226, this transistor, in turn, being connected to an actuating transistor 222. The actuating transistor may comprise a pnp transistor having its base electrode connected to receive a suitable control signal from the tape drive control circuitry 240 and, additionally, to receive the output voltage produced by the one-shot circuit 208.

A rewind solenoid may also be provided and is seen to include an energizing coil 238 connected to a coil driving transistor 236 which, in turn, is connected to an actuating transistor 232. The combination of transistors 232 and 236 and solenoid energizing coil 238 is substantially similar to the aforedescribed combination of transistors 222 and 226 and energizing coil 228. As shown, the actuating transistor 232 is adapted to receive a control signal supplied thereto by the tape drive control circuitry 240 and, additionally, to receive the output voltage produced by the one-shot circuit 208.

In operation, let it be assumed that the transcribing operator, upon completing a transcribing operation, now wishes to transcribe the ninth message recorded on the tape and not the next sequential recorded message. For example, if the operator has completed the transcription of message number 65 and now wishes to transcribe message number 74 instead of messsage number 66, a scanning operation is initiated to locate the desired message. The tape drive control circuitry 240 is operated to apply a negative potential to the base electrode of the transistor 222 whereby that transistor is rendered conductive so that a positive voltage is applied to the coil driving transistor 226. As is seen, the transistor 226 likewise is rendered conductive so that the fast-forward solenoid energizing coil 228 is energized and a fast-forward operation ensues.

Now, when the next recorded code signal is reproduced by the playback head 256, this signal is supplied to the filter 202 and is detected to thereby apply a binary 1 to one input of the AND gate 206. It is appreciated that, at this time, the transistor 216 had not been turned on and, therefore, the equivalent of a binary 1 is supplied from the collector electrode thereof to the other input of the AND gate 206. Consequently, a triggering signal is supplied by the AND gate to the one-shot circuit 208, causing the one-shot circuit to produce an output pulse of predetermined duration. This output pulse activates the tone signal generator 246 so that the transcriber operator is apprised of the fact that a code signal has been detected. In addition, the positive voltage of this output pulse results in a positive voltage at the base electrode of the actuating transistor 222, thereby deactuating this transistor and turning off the coil driving transistor 226. Hence, the fast-forward solenoid is de-energized for the duration of the one-shot output pulse, and the movement of the tape past the playback head 256 is temporarily halted.

The one-shot circuit output pulse also causes the capacitor included in the timing circuit 212 to charge up to a level sufficient to turn on the transistor 216. Thus, shortly after the AND gate 206 supplies the triggering signal to the one-shot circuit 208, the input signal supplied from the collector electrode of the transistor 216 is reduced to the equivalent of a binary 0, thereby disabling the AND gate. Now, at the conclusion of the one-shot circuit pulse duration, the tone signal generator 246 is deactuated and the fast-forward solenoid energizing coil 228 is again energized to resume the fast-forward movement of the tape.

It is appreciated that, if the AND gate 206 and the timing circuit 212 had been omitted, then, when the fast-forward movement of the tape is resumed, the previously detected code signal, which is recorded on a discrete area of the tape, could again be detected and the aforedescribed operation would occur. Conceivably, this repetitive operation would prevent further movement of the tape. However, in view of the time constant of the timing circuit 212, the transistor 216 will continue to supply a binary 0 to the AND gate 206 for a given length of time determined by the timing circuit parameters once the one-shot circuit output pulse has terminated. It is thus seen that the AND gate 206 in conjunction with the timing circuit 212 prevents the tape from being locked against further movement once a code signal is detected.

As an alternative embodiment, the timing circuit 212 and transistor 216 may be replaced by a conventional one-shot circuit which, for example, may be responsive to a negative transition in the triggering signal applied thereto. Other timing circuit configurations may, of course, be used.

The foregoing operation of the transcribe scan control circuit 200 is repeated until nine individual tone indications are detected by the transcribing operator. At the ninth indication the tape drive control circuitry 240 is suitably operated so that, when the one-shot circuit output pulse terminates, the energization of the fast-forward solenoid energizing coil 228 is not resumed. Hence, the transcribing operator is apprised that the tape has been suitably moved so that selected message (eg. message 74) is in position to be transcribed.

After the selected message is transcribed, the operator now may wish to return to the normal message sequence and, in particular, to the particular message which normally would have been transcribed in sequence (i.e., message No. 66). This is achieved by suitably operating the tape drive control circuitry 240 to actuate the transistor 232 which, in turn, turns on the transistor 236 so that the rewind solenoid energizing coil is energized. As a result thereof, the tape is moved in a reverse direction past the playback head 256.

Now, when a recorded code signal is reproduced, this signal is detected by the filter circuit 202 and the aforedescribed operation resulting in a one-shot circuit output pulse is obtained. Thus, when being reversed, the rewind solenoid is temporarily de-energized and an output tone signal is produced when the recorded code signal is detected. By repeating this operation, the tape can be halted when the appropriate number of indications have been counted so that the next sequentially recorded message is in position to be transcribed.

A noise suppressing circuit 281, similar to the aforedescribed noise suppressing circuit 81, is provided to suppress undesired background noise and tape hiss which accompanies a playback operation from the transcription transducer site. In view of the substantial similarities between the noise suppressing circuit 281 and the aforedescribed noise suppressing circuit 81, it is appreciated that a complete understanding of the structure and operation of the noise suppressing circuit 281 does not require further elaboration thereon. Suffice it to say that, in addition to the resistor 302, the selectively operable voltage divider circuit includes a capacitor 301 connected in series with the resistor 302 to further enhance the attenuation of disturbing higher frequency signals. Hence, it is seen that, when the audio signal reproduced by the playback head 256 is of a sufficiently high magnitude, the FET 300 is not actuated and the audio signal transmission channel is not shunted to ground by the resistor 302 and the capacitor 301. Accordingly, this higher level audio signal is only negligibly attenuated prior to amplification by the amplifier 280. However, should the signal level of the reproduced audio signal fall below the reference threshold level, then the gate electrode of the FET 300 is suitably biased to render the FET conductive. In that event, the audio signal transmission channel is shunted to ground by the resistor 302 and capacitor 301. The voltage divider thus formed by the resistor 276 and the shunting resistor and capacitor circuit is such that the voltage provided at the junction defined by the resistors 276 and 302 is substantially divided to a reduced magnitude to thereby effectively mute the audio signal.

Automatic Tape Advance

Figure 4:
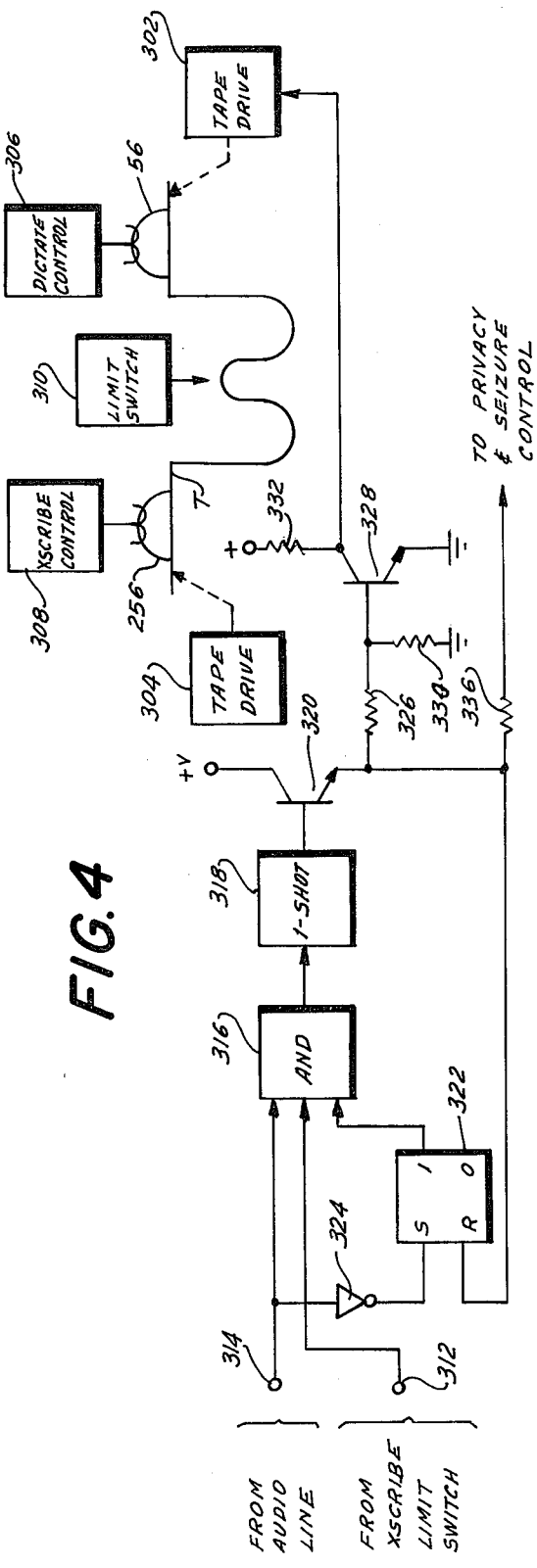
FIG. 4 is a representation in partial block and partial schematic form of automatic record medium advancing apparatus which is operable during a transcription operation.

In the preferred embodiment of the record/reproduce station of the central dictation system, the endless loop of magnetic tape is capable of being independently transported past a record/playback head disposed at the dictation transducer site and a playback head disposed at the transcription transducer site. The respective transducers are spaced apart and a reserve supply of dictated tape awaiting transcription normally is provided between these sites. This configuration is schematically depicted in FIG. 4 wherein a portion of the endless loop of tape T is seen to be bidirectionally movable with respect to the record/playback head 56 and the playback head 256, these heads being spaced apart. In addition, at a convenient intermediate position, the reserve supply of dictated tape T awaiting transcription is seen to be stored in serpentine fashion. An appropriate chamber or guide members may be provided to define a storage sector. It normally is expected that audio information will be dictated at a faster rate than that at which it is transcribed. Additionally, since the record/reproduce station is capable of communicating with a number of individual dictate stations, whereas only a single transcribing operator is provided to transcribe the dictated information, the storage sector disposed between the heads 56 and 256 normally will be provided with a reserve supply of dictated tape. However, the possibility exists that a transcription operation can proceed while no further dictation operations are initiated. Hence, as the tape T is moved past the playback head 256 during transcription, the reserve of dictated tape disposed in the storage sector might become exhausted. In that event, the tape extending between the respective heads 56 and 256 becomes taut. It is appreciated that, in the absence of any further dictation operations, the tape drive apparatus 302 normally provided at the dictation transducer site will maintain the tape T in its last-attained position. However, the tape drive apparatus 304 at the transcription transducer site cannot be further operated once the tape is taut without destroying the tape. Therefore, that portion of the last dictated message which is recorded on the segment of tape T extending between the heads 56 and 256 cannot be transcribed until a subsequent dictate operation is initiated so that a sufficient reserve of dictated tape will be furnished to the transcription transducer site.

In accordance with another feature of the present invention, tape advance apparatus is provided to avoid the aforenoted difficulty. That is, to permit the completion of a full transcription operation so that an entire dictated message can be transcribed, the tape drive apparatus 302 at the dictation transducer site is selectively operated to advance a sufficient supply of tape past the record/playback head 56 and to the storage sector so that the transcription of the dictated message can be completed. This function is achieved by an AND gate 316, a one-shot circuit 318, transistors 320 and 328 and a flip-flop circuit 322.

The AND gate 316 is adapted to sense when the tape T is taut between the respective heads 56 and 256 at a time when the record/reproduce station is not communicating with a remote dictate station. Accordingly, a first input of the AND gate 316 is connected to a terminal 314 which is adapted to receive a DC potential representing the communicating status of the record/reproduce station. Accordingly, the terminal 314 may be provided with a relatively positive potential, such as a binary 1 when the record/reproduce station is not communicating with a remote dictate station, and, conversely, may be supplied with a binary 0 during communication. It is seen that the signal applied to the terminals 314 may be the same as or derived from the signal applied to the terminal 110 of FIG. 2.

An additional input of the AND gate 316 is supplied with a signal applied to the terminal 312 by a limit switch 310. This limit switch is adapted to sense when the tape T is taut between the respective heads 56 and 256 and, therefore, may comprise a mechanical switch disposed in the storage sector and having a movable contact which is actuated by the tapt T when such tape is taut. Alternatively, the limit switch 310 may comprise a photoelectric element or other conventional sensing device capable of providing an indication, such as a binary 1 upon sensing a tautness condition in the tape. Although not shown herein, actuation of the limit switch 310 is adapted to provide an indication to apprise the transcribing operator of the resultant condition.

A third input of the AND gate 316 is connected to the 1 output of a set/reset flip-flop circuit 322. The flip-flop circuit may comprise a conventional bistate device, such as a bistable multivibrator, including a set input connected by an inverting circuit 324 to the terminal 314 and a reset input connected to the emitter electrode of the transistor 320. As will soon be described, the flip-flop circuit 322 normally is disposed in its set state whereby a binary 1 is provided at its 1 output and is reset when the transistor 320 is actuated so as to provide a binary 0 at its 1 output.

The AND gate 316 is connected to the one-shot circuit 318 so as to supply a triggering signal thereto, whereupon the one shot circuit produces an output pulse signal of predetermined duration. This one-shot output pulse is of suitable magnitude and polarity to bias the transistor 320 to its conducting state. When this transistor is turned on, a voltage derived from the source of operating voltage +V is coupled to the reset input of the flip-flop circuit 322 and, additionally, to the base electrode of the transistor 328 by a resistor 326 and, furthermore, to a privacy and seizure control circuit by a resistor 336.

The privacy and seizure control circuit is not shown herein but is adapted to produce suitable voltages on various conducting channels included in the conducting cable, such as cable 18', to prevent a remote dictate station from seizing the record/reproduce station for the duration of the one-shot output pulse. A suitable privacy and seizure control circuit which may be used with the present invention is described in U.S. Pat. No. 3,835,261.

A positive potential applied to the base electrode of the transistor 328 is sufficient to actuate this transistor so that the tape drive apparatus 302 is energized. For example, when the transistor 328 is actuated, it is appreciated that essentially ground potential is applied to the tape drive apparatus. This is sufficient to operate the tape drive apparatus so that the tape T is moved past the record/playback head 56 and to the storage sector to provide a sufficient reserve whereby the dictated information thereon can be transcribed. As one example, the collector electrode 328 may be coupled to the fast-forward solenoid energizing coil 132 or the forward solenoid energizing coil 170 previously discussed with respect to FIG. 2. Of course, suitable control circuitry may be provided between the transistor 328 and the solenoid energizing coils. In the intereset of simplification, such additional circuitry may be included in the tape drive apparatus 302.

In operation, let it be assumed that a sufficient reserve of tape T initially is provided between the respective heads 56 and 256. Let it also be assumed that the record/reproduce station now is communicating with a remote dictate station. Accordingly, a binary 0 is supplied to the terminal 314 and is inverted by the inverting circuit 324 so as to drive the flip-flop circuit 322 to its set state.

Ler it now be assumed that, while the transcribe control apparatus 308 is operating in its normal manner so that the dictated messages recorded on the tape T are transcribed, the record/reproduce station no longer communicates with any dictate stations. At this time, such absence of communication will not effect the transcribing operation. Accordingly, the tape drive apparatus 304 will be operated in conjunction with the transcribing control apparatus 308 and the tape T will be moved past the playback head 256 during transcription. Once the reserve of tape T disposed in the storage sector is exhausted, the tape will be taut between the respective heads 56 and 256 and this condition will be sensed by the limit switch 310. It is recalled that, when the tape T is taut, further transcription is prevented to avoid destroying the tape. Accordingly, the tape drive apparatus 304 will be disabled.

When the limit switch 310 is actuated, and the record/reproduce station is no longer communicating with a remote dictate station, then a binary 1 will be supplied to each input of the AND gate 316. Accordingly, a triggering signal is applied to the one-shot circuit 318, resulting in the one-shot circuit output pulse having a predetermined duration. This pulse turns on the transistor 320 which, in turn, resets the flip-flop circuit 322 to thereby disable the AND gate 316. Also, a positive voltage is applied by the transistor 320 to the privacy and seizure control circuit to prevent any other remote dictate station from seizing the record/reproduce station. Finally, the positive voltage provided at the emitter electrode of the transistor 320 actuates the transistor 328 which, in turn, energizes the tape drive apparatus 302. As is understood, when the tape drive apparatus 302 is energized, the tape T is moved into the storage sector from the dictation transducer site.

Now, when the one-shot circuit output pulse terminates, the transistor 320 is turned off to thus remove the positive voltage previously applied thereby to the privacy and seizure control circuit. Hence, the record/reproduce station is available to communicate with a remote dictate station. Also, when the transistor 320 is turned off, the transistor 328 is rendered non-conductive and a relatively positive voltage is coupled to the tape drive apparatus 302 from the transistor collector electrode. Thus, the tape drive apparatus 302 is de-energized. However, a sufficient reserve of tape now is provided at the storage sector so that the tape drive apparatus 304 may be operated to advance the tape T past the playback head 256 and the transcribe control apparatus 308 may be operated to complete the transcription of the previously dictated message.

Since the flip-flop circuit 322 had been reset, a subsequent tautness condition in the tape T which is detected by the limit switch 310 will not be effective to enable the AND gate 316 to supply a triggering signal to the one-shot circuit 318. This is because the reset condition of the flip-flop circuit 322 results in a binary 0 applied to the AND gate by the 1 output of the flip-flop circuit.

This flip-flop circuit cannot be disposed in its set state until another remote dictate station has seized the record/reproduce station and communicates therewith. Consequently, this limited advance of tape from the dictation transducer site is restricted to only a single occurrence to permit the completion of a transcription operation of an entire dictated message. Of course, after subsequent dictated messages have been recorded, the illustrated apparatus is conditioned for another tape advance operation should the aforedescribed prerequisite conditions exist.

While the present invention has been particularly shown and described with reference to a certain perferred embodiment, it will be obvious to those of ordinary skill in the art that various changes and modifications in form and details may be made without departing from the spirit and scope of the invention. For example, various alterations may be effected in the described circuitry. Various discrete circuit components may be replaced by conventional logic circuit elements and alternative logic circuits may be used in place of those elements illustrated herein. As an example, the disconnect detector may comprise a one-shot circuit and the noise suppressing circuit may comprise active attenuators. Where desired, NOT-AND and NOT-OR circutry may be used to replace the illustrated AND gates. Similarly, NAND/NOR circutry may be used where desired. The substitution of such logic components to perform essentially the same functions as performed by the illustrated circuit elements can be readily achieved by those of ordinary skill in the art. It is therefore intended that the appended claims be interpreted as including the foregoing and other such changes and modifications.

What is claimed is:

1. In a recording system having a recording station adapted to communicate with a record/reproduce device whereat information is recorded on and reproduced from a recording medium through transducer means, apparatus comprising:

a source for supplying a signal of relatively low oscillating frequency;

detecting means for detecting when communication between said recording station and said record/reproduce device is terminated and for producing an output signal representative thereof, said output signal having a predetermined time duration;

drive means for providing relative movement between said recording medium and said transducer means;

means for applying said output signal of predetermined duration to said drive means to effect forward relative movement between said recording medium and said transducer means for the duration of said output signal;

switch means coupled between said source and said transducer means;

means for applying said output signal to said switch means to actuate said switch means for said predetermined time duration to supply said low frequency signal to said transducer means, whereby said low frequency signal to said transducer means, whereby said low frequency signal is recorded on said recording medium for the duration of said output signal; and control means coupled to said transducer means and responsive to the reproduction of said low oscillating frequency signal during reverse relative movement between said recording medium and said transducer means to prevent further reverse relative movement thereof and to cause said drive means to effect forward relative movement between said recording medium and said transducer means for a pre-established time duration.

2. The apparatus of claim 1 wherein said drive means includes a forward drive solenoid energizable to cause said recording medium to move in a forward direction, a rewind drive solenoid energizable to cause said recording medium to move in a reverse direction, and solenoid energizing means for selectively energizing said forward drive solenoid or said rewind drive solenoid; and wherein said drive control means comprises filter means for sensing said reproduction of said low oscillating frequency signal when said solenoid energizing means energizes said rewind drive solenoid, pulse producing means coupled to said filter means for producing a pulse of said pre-established time duration when said low oscillating frequency signal is sensed, and gate means coupled to said pulse producing means and responsive to said pulse to deenergize said rewind drive solenoid and to energize said forward drive solenoid for said pre-established time duration.

3. In a recording system having a recording station adapted to communicate with a record/reproduce device whereat information is recorded on and reproduced from a recording medium through transducer means, apparatus comprising:
a source for supplying a signal of relatively low oscillating frequency;
detecting means for detecting when communication between said recording station and said record/reproduce device is terminated and for producing an output signal representative thereof, comprising:
voltage sensing means coupled to said recording station for sensing a predetermined change in voltage produced when said recording station terminates communication with said record/reproduce device;
a timing circuit including capacitance means normally charged to a predetermined level when said recording station is in communication with said record/reproduce device and discharged when said voltage sensing means senses said predetermined voltage change;
and AND gate means coupled to said voltage sensing means and said timing circuit for producing said output signal proportional to the coincidence of the signal produced by said voltage sensing means and the signal produced by said timing circuit while said capacitance means discharges;
drive means for providing relative movement between said recording medium and said transducer means;
means for applying said output signal to said drive means to effect forward relative movement between said recording medium and said transducer means for the duration of said output signal;
switch means coupled between said source and said transducer means; and
means for applying said output signal to said switch means to actuate said switch means for said duration of said output signal to supply said low frequency signal to said transducer means, whereby said low frequency signal is recorded on said recording medium for the duration of said output signal.

4. The apparatus of claim 3 wherein said drive means comprises a forward drive solenoid energizable to cause said recording medium to move in a forward direction; and solenoid energizing means coupled to said AND gate means and responsive to said output signal to energize said forward drive solenoid for said predetermined duration.

5. The apparatus of claim 3 wherein said switch means comprises transistor switch means connected in series between said source and said transducer means and having a control input coupled to said AND gate means, whereby said transistor switch means transmits said low oscillating frequency signal to said transducer means for said predetermined duration.

6. The apparatus of claim 5 wherein said transistor switch means comprises a field effect transistor whose gate electrode is coupled to said AND gate means and responsive to said output signal for transmitting said low oscillating frequency signal through its source-drain circuit; and further including amplifier means connected in series with said source-drain circuit, and a second field effect transistor whose gate is coupled to said AND gate means and whose source-drain circuit is connected in series between said amplifier means and said transducer means.

7. In a central dictation system having a central record/reproduce device adapted to communicate individually with any one of plural recording stations for the recording of dictation on and reproducing of dictation from a bi-directionally movable recording medium at said record/reproduce device, apparatus for preventing a previously dictated message from being reproduced to a recording station, comprising:
a source for supplying a signal of relatively low oscillating frequency;
detecting means for detecting when communication between a recording station and said record/reproduce device is terminated;
timing circuit means coupled to said detecting means for producing an output pulse of predetermined time duration upon the sensing of the termination of communication;
bi-directional drive means for moving said recording medium past transducer means selectively in a forward or reverse direction;
means for applying said output pulse of predetermined duration to said drive means to effect forward movement of said recording medium for the duration of said output pulse;
switch means coupled between said source and said transducer means;
means for applying said output pulse to said switch means to actuate said switch means for said predetermined time duration to supply said low frequency signal to said transducer means, whereby said low frequency signal is recorded on said recording medium at the conclusion of a dictated message for the duration of said output pulse;
filter means coupled to said transducer means for sensing the reproduction of said low frequency signal when said recording medium is driven in the reverse direction by said drive means;
pulse producing means coupled to said filter means for producing a pulse of pre-established duration when said low frequency signal is sensed; and
means for applying said pulse of pre-established duration to said drive means for terminating reverse movement of said recording medium and effecting forward movement thereof for said pre-established duration.

8. In a transcribinhg device for transcribing information recorded on a recording medium in a format wherein successive messages are separated by a recorded predetermined low frequency signal, apparatus comprising:
   drive means for providing relative movement between said recording medium and transducing means, said movement including a normal forward movement for reproducing said information, a fast forward movement for rapidly scanning said recording medium and a reverse movement;
   drive control means coupled to said drive means for selectively establishing a mode of operation for said relative movement;
   filter means coupled to said tranducing means for detecting the reproduction of said low frequency signal;
   means coupled to said filter means for producing an output signal of predetermined duration when said low frequency signal is detected;
   indicating means responsive to said output signal for producing an indication of said predetermined duration representing that the end of one message and the beginning of the next succeeding message has been reached; and
   means for applying said output signal to said drive means for temporarily halting said relative movement for said predetermined duration and for resuming said relative movement upon the conclusion of said output signal.

9. The apparatus of claim 8 wherein said drive means includes a fast forward drive solenoid and a reverse drive solenoid; fast forward energizing means for energizing said fast forward solenoid and reverse energizing means for energizing said reverse solenoid; said fast forward and reverse energizing means being selectively energized by said drive control means; and wherein said output signal applying means applies said output signal as a disabling signal to said fast forward and reverse energizing means for said predetermined duration.

10. The apparatus of claim 8 wherein said output signal producing means comprises pulse generating means for producing an output pulse of said predetermined duration when said filter means detects said low frequency signal; and inhibit means coupled to said pulse generating means for inhibiting the subsequent production of an output pulse for a delay time following the conclusion of an immediately preceding output pulse to prevent the very same low frequency signal on said recording medium to be repeatedly detected when relative movement between said recording medium and said transducer means resumes.

11. The apparatus of claim 8, further comprising audio signal reproducing means coupled to said transducer means and including a signal transmission channel for transmitting reproduced messages from said transducer means to sound reproducing means when said relative movement between said recording medium and said transducer means is said normal forward movement; and actuable shunt means connected to said signal transmission channel to attenuate the level of the signal in said transmission channel in the event that said level is less than a threshold level, thereby muting the reproduction of noise by said sound reproducing means.

12. The apparatus of claim 11 wherein said actuable shunt means comprises a voltage divider; switch means actuable to connect said voltage divider to a reference potential; comparison means coupled to said signal transmission channel for comparing the level of said signal in said transmission channel to a predetermined threshold level and to apply an actuating signal to said switch means if said signal level decreases below said threshold level; and delay means coupled to said comparison means for delaying the application of said actuating signal to said switch means for a time to avoid actuating said switch means when said signal level decreases below said threshold level for short periods.

13. A central dictation system having at least one record/reproduce device whereat dictated messages are recorded on and reproduced from a recording medium by transducer means at a dictation site and said dictated messages are reproduced from said recording medium by transducer means at a transcription site, each record/reproduce device adapted to communicate with one of plural remote dictate stations and with a transcribe station simultaneously, comprising:
   an end of dictation recording section including:
      a source for supplying a signal of relatively low oscillating frequency;
      detecting means for detecting when communication between one said record/reproduce device and a remote dictate station is terminated;
      first pulse generating means responsive to said detecting means for producing a first output pulse of predetermined time duration when said communication is terminated;
      first drive means for providing relative movement between said recording medium and said transducer means at said dictation site;
      means for applying said first output pulse of predetermined duration to said drive means to effect forward relative movement between said recording medium and said transducer means at said dictation site for the duration of said first output pulse;
      switch means coupled between said source and said transducer means at said dictation site; and
      means for applying said first output pulse to said switch means to actuate said switch means for said predetermined time duration to supply said low frequency signal to said transducer means, whereby said low frequency signal is recorded on said recording medium for the duration of said first output pulse;
   a start of dictation sensing section for preventing the reverse relative movement of said recording medium with respect to said transducer means at said dictation site into a previously recorded dictated message, including:
      filter means coupled to said transducer means at said dictation site for sensing the reproducing of said low frequency signal when said first drive means provides reverse relative movement between said recording medium and said transducer means;
      second pulse generating means coupled to said filter means for producing a second pulse of second predetermined duration when said low frequency signal is sensed; and
      means for applying said second pulse to said first drive means to terminate said reverse relative movement of said recording medium and to provide forward relative movement thereof for said second predetermined duration; and a transcribe scanning section including:
second drive means for providing relative movement between said recording medium and said transducer means at said transcription site, said relative movement including a fast forward movement and a reverse movement;
drive control means coupled to said second drive means for selectively establishing a relative movement of said recording medium;
second filter means coupled to said transducing means at said transcription site for detecting the reproduction of said low frequency signal;
third pulse generating means for producing a third pulse of third predetermined duration when said low frequency signal is sensed by said second filter means;
indicating means responsive to said third pulse for producing an indication of said third predetermined duration representing that the end of one recorded message and the beginning of the next succeeding message has been reached; and
means for applying said third pulse to said second drive means for temporarily halting said relative movement at said transcription site for said third predetermined duration and for resuming said relative movement upon the conclusion of said third pulse.

* * * * *